United States Patent

Tullos et al.

[15] 3,653,070

[45] Mar. 28, 1972

[54] NESTED SLEEVE RECORDING PEN HEAD

[72] Inventors: Aubrey R. Tullos; Leslie H. Creed, both of P.O. Box 2373, Odessa, Tex. 79760

[22] Filed: Feb. 3, 1970

[21] Appl. No.: 8,246

[52] U.S. Cl. ............................................................346/140
[51] Int. Cl. ........................................................G01d 15/16
[58] Field of Search ...........................346/140; 401/198, 199

[56] References Cited

UNITED STATES PATENTS 1,405,409 2/1922 Hall ......................................346/140
1,720,226 7/1929 Lovejoy ................................346/140

*Primary Examiner*—Joseph W. Hartary
*Attorney*—Strauch, Nolan, Neale, Nies & Kurz

[57] ABSTRACT

Special construction of a recording pen for use with capillary tubing in an inking pen system. The pen includes a stainless steel capillary tube terminating in the pen head construction which includes a removable recording pen tip made of a suitable material providing passage for flow of ink to a recording surface. The head includes several coaxial nesting sleeves cooperating to form a small head reservoir located immediately adjacent the pen tip. The end of the capillary tubing is secured to the pen head by bonding between the end of the capillary tubing and at least the outer one of the coaxial sleeves.

14 Claims, 7 Drawing Figures

PATENTED MAR 28 1972

3,653,070

INVENTORS
AUBREY R. TULLOS
LESLIE H. CREED

BY

Strauch, Nolan, Neale, Nies & Kurz
ATTORNEYS

NESTED SLEEVE RECORDING PEN HEAD

CROSS-REFERENCE TO RELATED APPLICATION

Small recording pens which use capillary tubing and a sleeve pen head including a pen tip at one end have been previously known, and one example is illustrated in copending U.S. application Ser. No. 827,758 filed May 26, 1969, for Reservoir Type Inking Pen System.

BACKGROUND OF THE INVENTION

The present invention resides in specific and improved construction of a sleeve type recording pen head enabling a pen head to perform the same function and be used in a manner similar to that of the pen head shown in the aforedescribed application. In that disclosure, the pen head is made with a single sleeve piece which is internally machined to provide the reservoir chamber and the limiting shoulder against which the pen tip seats. In the present invention, the pen head is made of two or more small sleeve units which are coaxially arranged to provide the attachment end for the capillary tubing as well as the seating shoulder for the pin tip and an internal reservoir of desired capacity. Several advantages accrue from making the pen head with coaxial sleeves: internal machining is eliminated; short lengths of regular tubing can be used as standardized head sleeves and internal nesting tube pieces can be standardized so that, in cooperation with the external sleeve, internal head reservoirs of differing capacities can be readily provided as required by the recorder on which the pen is to be used.

The use of one or more nesting tube pieces internally of a pen head sleeve in accord with the present invention affords numerous possibilities of combination capillary tube pen heads readily adapted to mass production assembly techniques which avoid the need of expensive internal machining.

SUMMARY OF THE INVENTION

A primary object of this invention resides in the provision of novel inking pens for recording systems in which the pens include a short capillary pen tube and a pen head constructed of nested tubes which provide holding and locating structure for a writing tip.

Another object resides in providing a pen with a supply tube whose passage is of extremely small, capillary size securely sealed and bonded to a sleeve including one or more nested components serving as a holder for a writing pen point and with the assembled pen point providing a small chamber serving as a secondary ink reservoir.

A still further object resides in providing a novel inking pen in which the pen head consists of an outer sleeve, a shorter inner sleeve, a pen feed tube inserted into an end or nested sleeves, bonding material sealing that end of the nested sleeves and the inlet and a writing point spigotted into the outer sleeve against the end of the inner sleeve.

In conjunction with the foregoing objects, various different arrangements of nested sleeves and sleeve components are contemplated in assembling a pen, which has a pen feed tube sealed to one end of the head and an inner sleeve which provides a pen head ink reservoir as well as a limiting abutment internal of the outer sleeve for locating the spigotted insertion of a writing pen tip.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

This invention resides in the head portion of capillary type recording pens shown as used in a reservoir-type inking pen system for recording charts.

Figure 1:
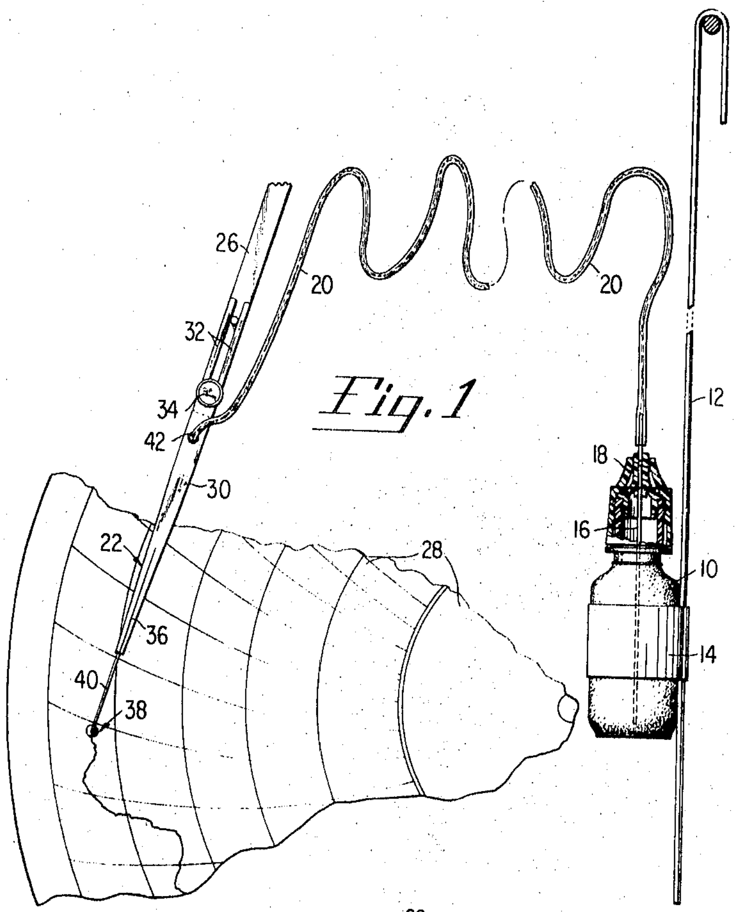
FIG. 1 is a partial broken away front elevation view of a recording instrument showing an ink container reservoir, capillary supply tubing, a pen arm and a pen head of the general kind to which the present invention pertains.

In general, and as shown in FIG. 1, such a system can include an ink container 10 secured to a support rod 12 by a clip 14, the units working in conjunction to maintain the ink container 10 in a vertical disposition. An extremely small diameter capillary stinger tube 16, made from stainless steel, is inserted through a stopper 18 in the top of container 10 projecting down to a position just above the bottom of the container. A length of plastic capillary tubing 20, suitable for the installation as desired, extends from the upper end of stinger 16 to a recording pen assembly 22.

The plastic tubing 20 must be light and extremely flexible and has a capillary passage. The plastic tubing slips in a telescopic manner tightly over the end of stinger 16 and has its other end also slipped in a telescopic manner tightly over the pen head feed tubing 40, also made of stainless steel of a similar size to that of the stinger 16.

Figure 2:
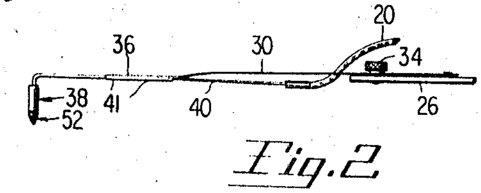
FIG. 2 is a side view of the pen assembly showing a leaf spring with the attached pen head.

Viewing both of FIGS. 1 and 2, the illustrations show only a few portions of a circular chart recorder, e.g., the recorder pen operating arm 26 and a portion of a circular chart 28 which is normally rotated by a timed drive and enabling a timed recording in conjunction with movement of the recorder arm 26.

The pen assembly 22 includes as part of an effective pen arm, a thin stainless steel spring leaf arm 30, the rear end of which can be bifurcated at 32 to provide a suitable means for securing the pen assembly 22 to the recorder operating arm 26. As shown, the bifurcated end 32 can slip under a small thumb screw 34 which can be tightened to hold the pen assembly on the operating arm. The end 36 of the spring leaf closest to the pen head is tapered and can be slightly bent to form a small inverted trough form.

The pen assembly includes a pen head 38 and the ink supply or feed tube 40, the latter being an extremely small (0.0355 inch O.D. × 0.023 inch I.D.) stainless steel capillary tube, but there again precise dimensions are not critical. The tube 40 at the pen head end is bent at right angles. At its midpoint 41 the tube 40 is secured, and the illustrated example shows securing by silver solder to the under side of the tapered end 36 of the spring leaf arm 30. The pen feed tube 40 terminates just short of a small aperture 42 through the spring leaf and the plastic capillary tubing 20 from the reservoir leads from the top side of the spring leaf pen arm 30 through aperture 42 to telescope over the end of the pen feed tube 40.

Excepting for details of the pen head 38, as will be hereinafter described, the aforedescribed system has been disclosed and claimed in copending application Ser. No. 827,758, to which reference may be made should a more detailed description of the inking system be deemed desirable.

PEN HEADS

Details of the nested sleeve pen head constructions are seen in the greatly enlarged views of FIGS. 3–7, each of which illustrates a different embodiment. A removable writing tip is used with all of the embodiments however, the writing tip is shown only in the FIG. 3 embodiment. In all embodiments, an ink feed tube is secured at one end of the pen head sleeve arrangement to provide a sealed inlet connection, while the other end of the sleeve arrangement is adapted to receive the writing point. Each of the nested sleeve embodiments provides an abutment shoulder to define the insertion limit position of the writing tip and thereby provide a small ink reservoir within the nested sleeve pen head.

The outer sleeves of the illustrated pen heads have a length of approximately 0.25 inch and an O.D. of approximately 0.10 inch, and such dimensions result in a very satisfactory recording pen. The length can be made longer or shorter and the O.D. can be changed, however increased size makes the pen heavier and decreased size requires different techniques in assembly. The illustrated pen head sleeves and feed tubes are made from stainless steel, however, they can be made from other materials such as plastics. Details of the different embodiments will now be described.

Figures 3, 4:
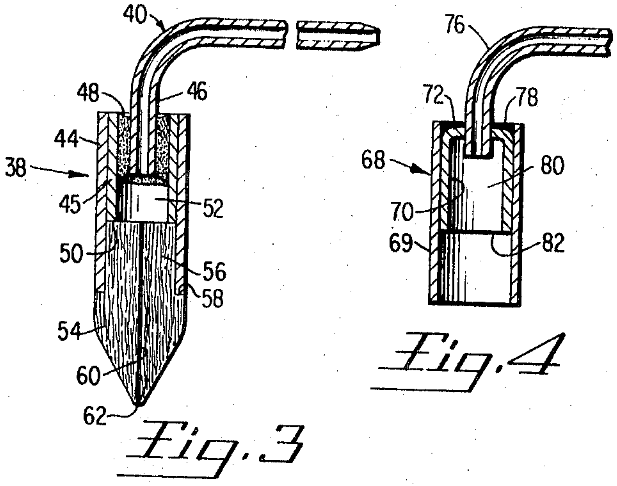
FIGS. 3 and 4 are enlarged cross section views illustrating the various components of two embodiments, of a nested sleeve pen head having dual bonded sleeves and capillary tube.

FIG. 3 embodiment. The pen head 38 includes two cylindrical thin-wall sleeves 44 and 45 bonded together and secured to the short bent end 46 of the capillary pen feed tube 40, by suitable bonding material 48. Inner sleeve 45 is shorter than and is dimensioned to slidably fit within the outer sleeve 44 and is positioned with one of its ends adjacent one end of the outer sleeve, which for descriptive purposes will be referred to as the upper end. Bent end 46 of feed tube 40 extends approximately 0.10 inch into the upper end of the nested sleeves and the three pieces bonded together with, for example, silver solder 48, which can flow between the slidably fitting walls of the two sleeves.

The lower end 50 of inner sleeve 45 constitutes an annular abutment spaced below the open end of the bent leg 46 of the pen feed tube providing a small chamber 52 at the upper end of the space surrounded by the lower portion of outer sleeve 44. Inserted up into the lower end of sleeve 44 is a stiff porous fiber pen tip 54. The upper half 56 of pen tip 54 is cylindrical, has a snug fit within the cylindrical sleeve 44, and extends up to the internal sleeve abutment 50 which limits the pen tip insertion position. The upper surface of the porous tip thus serves as the lower wall of the small chamber 52. Chamber 50 constitutes a portion of a secondary reservoir system which inherently incorporates the body portion of the porous tip. The lower part of the writing tip can be shouldered as at 58 to provide an alternative or supplementing structure limiting the insertion position of the tip. A hole 60 of minute diameter (0.009 inch) extends down through the porous tip to an opening at the writing point 62, tapered to a desired shape. In some applications it is desirable that the tapered lower exterior end of tip 54 be coated with a non-porous material 59 such as epoxy, which will also serve to hold the tip in the sleeve in case of a loose fit. Various suitable materials can be used as the pen tip and the described installation enables the pen tip to be removed and replaced or washed to flush old ink from the porous fibers or the hairline hole 60. Other than in the combination nested sleeve pen head, the writing tip per se is not part of this invention.

A similar tip is used with and is assembled in the same manner in each of the nested sleeve embodiments shown in FIGS. 4–7 and therefore it is not necessary to repeat details of tip construction when describing those embodiments.

FIG. 4 shows a nested sleeve pen head 68 with dual sleeves 69 and 70 essentially like pen head 38 excepting that the inner sleeve 70 can be made with a thinner wall and has its upper end 72 turned inwardly to provide a smaller diameter opening having a close free fit with the bend end 74 of the pen feed tube 76. In this instance the bent pen tube end 76 extends approximately 0.05 inch down into the inturned end of inner sleeve 70 and silver solder 78 is used to bond the tube end 76, inner sleeve 70 and outer sleeve 59 together and seal the inlet end. The interior of inner sleeve 70 provides the small pen head ink reservoir 80 and the lower end 82 of the inner sleeve serves as the abutment for the inner end of a writing tip such as tip 54 in FIG. 3.

Figure 5:
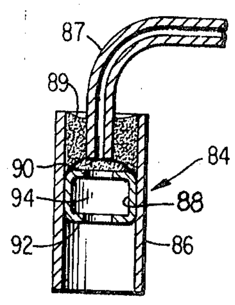
FIG. 5 is an enlarged cross section view of another embodiment of a nested sleeve pen head in which the capillary tube is bonded to the outer sleeve.

FIG. 5 shows a nested sleeve pen head 84 somewhat different from the two shown in FIGS. 3 and 4. Outer sleeve 86 remain essentially identical to the outer sleeves 44 and 69 but in this embodiment the lower bent end 87 of the pen feed tube is bonded, as by silver solder 89, coaxially within and to the upper end of the outer sleeve, extending down into the sleeve 86 an appropriate distance, e.g., 0.07 inch. The inner sleeve 88 has both ends 90 and 92 turned inward to confine a small chamber 94 which will serve as the ink reservoir. The lower inturned edge 92 of the inner sleeve piece 88 serves as the abutment for the spigotted end of a writing tip as was described for FIG. 3.

The small inner sleeve 88 can be inserted before the bent end 87 of the pen tube is bonded to outer sleeve 86, in which case the silver solder 89 will flow between the two sleeves and also bond them together. Alternatively the inner sleeve can be inserted after the pen tube is bonded to the outer sleeve 86 and will be retained in place by the spigotted writing tip or its fit can be made as a snug sliding fit within the outer sleeve so it is self retaining.

Figure 6:
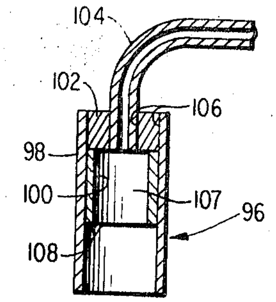
FIG. 6 is an enlarged cross section view of a fourth embodiment of a nested sleeve pen head in which the capillary tube and a space plug are bonded inside one end of the outer sleeve and the nested sleeve abuts the spacer plug.

FIG. 6 shows a dual nested sleeve pen head 96 which is assembled from the standard size outer sleeve 98, a straight wall inner sleeve 100, an apertured end plug 102 and the capillary pen tube with bent end 104. In this embodiment the bent tube end 104 is inserted in the apertured end plug 102 which is fitted into the end of outer sleeve 98, with the fit between the tube, plug and sleeve permitting room for flow of solder, and the three pieces then bonded by silver solder at nested surfaces 106. As was described in conjunction with the FIG. 5 embodiment, the short inner sleeve 100 can be placed inside outer sleeve 98 before the bonding occurs and will be bonded to the outer sleeve, or it can be inserted after the tube end 104, plug 102 and sleeve are bonded together. In either case the inside of inner sleeve provide the pen head reservoir 107 and the lower end 108 of the inner sleeve provides a locator abutment for the spigotted writing tip as was described for the FIG. 3 embodiment.

Figure 7:
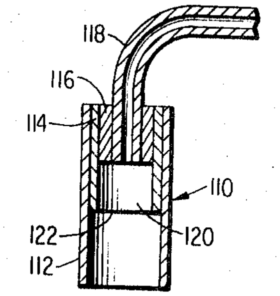
FIG. 7 is an enlarged cross section view of a fifth embodiment of a nested sleeve pen head in which three concentric sleeves are used in conjunction with the capillary tube.

FIG. 7 illustrates an arrangement similar to that of FIG. 3, excepting that instead of dual nested sleeves, the pen head 110 utilizes three nested sleeves 112, 114, and 116. In this instance the outer sleeve 112 and intermediate sleeve 114 can be identical with the two sleeves 44 and 45 of the FIG. 3 embodiment. The third or innermost sleeve 116 is used to more accurately concentrically locate the bent end 118 of the pen tube and has a length equal to the extent to which the bent end 118 is inserted into the nested sleeves, e.g., 0.07 inch. The three nested sleeves 112, 114 and 116 have a close free fit and the bent end 118 has a close free fit within the inner sleeve 116 to permit flow of silver solder. All three sleeves are located with their upper ends essentially aligned, the tube end 118 is inserted and the four pieces bonded by silver solder.

The space 120 between the lower end of inner sleeve 116 and the lower end 122 of the intermediate sleeve constitutes the pen head reservoir and the intermediate sleeve end 122 provides the limiting abutment for the spigotted writing tip as was described for the FIG. 3 embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An inking pen for use with recording apparatus comprising: a capillary pen tube having an ink discharge end; a pen head including nested sleeve components providing means at one end for ink inlet and means at the other end to hold and locate a writing tip; and means at the ink inlet end of said nested sleeve components bonding said inlet end and said discharge end of said capillary pen tube together.

2. An inking pen as defined in claim 1, wherein said nested sleeve components define an ink reservoir space within said pen head between said bonded end of said capillary pen tube and said means to locate a writing tip.

3. An inking pen as defined in claim 2 wherein said pen head has at least two nested sleeve components, the sleeve component nested just within the outermost sleeve component being shorter than the outermost sleeve component, encompassing said ink reservoir space and disposed so its end is spaced from the writing tip end of said outermost sleeve component thereby providing a limiting abutment for a writing tip.

4. An inking pen as defined in claim 3, wherein said bonding means bonds all said sleeve components together.

5. An inking pen as defined in claim 4, wherein all of said sleeve components are coaxially nested and concentrically arranged about the inlet end of said capillary pen tube.

6. An inking pen as defined in claim 5, including only two sleeve components and at least the inlet end of the inner sleeve is inturned to provide an opening, smaller than the inside diameter of said inner sleeve, into which said capillary pen tube projects and is bonded.

7. An inking pen as defined in claim 5, wherein there are at least three nested sleeve components, the innermost of which is shorter than the next adjacent sleeve component which in turn is shorter than the outermost sleeve component.

8. An inking pen as defined in claim 3, wherein said bonding means bonds said capillary tube to the inlet end of said outermost sleeve component and provides a sealed capillary ink inlet passage into said pen head.

9. An inking pen as defined in claim 8, wherein the inner sleeve component is disposed so both of its ends are spaced from the ends of the outermost sleeve component.

10. An inking pen as defined in claim 9, wherein said bonding means provides a bond and seal between the end of said capillary pen tube and only said outermost sleeve.

11. An inking pen as defined in claim 1, wherein said pen tube and said sleeve components are made from stainless steel.

12. An inking pen with a capillary feed tube and a pen head with a removable writing tip, said pen head consisting of an outer sleeve, a shorter inner sleeve nested within the outer sleeve, and said pen feed tube being inserted into an end of said nested sleeves, bonding material sealing that end of the two nested sleeves to said feed tube, and said writing tip being spigotted into the outer sleeve against the end of the inner sleeve.

13. An inking pen as defined in claim 12, wherein said sealed ends of said sleeves are adjacent each other.

14. An inking pen as defined in claim 12, wherein the interior diameter of said inner sleeve is substantially larger than the pen feed tube and provides an ink reservoir between the end of said feed tube and said writing tip.

* * * * *